(12) United States Patent
Smith

(10) Patent No.: US 11,214,323 B2
(45) Date of Patent: Jan. 4, 2022

(54) BICYCLE LOCK SYSTEM

(71) Applicant: Michael Smith, Bakersfield, CA (US)

(72) Inventor: Michael Smith, Bakersfield, CA (US)

( * ) Notice: Subject to any disclaimer, the term of this patent is extended or adjusted under 35 U.S.C. 154(b) by 209 days.

(21) Appl. No.: 16/545,552

(22) Filed: Aug. 20, 2019

(65) Prior Publication Data
US 2021/0053636 A1 Feb. 25, 2021

(51) Int. Cl.
*B62H 5/14* (2006.01)
*E05B 71/00* (2006.01)

(52) U.S. Cl.
CPC .............. *B62H 5/142* (2013.01); *B62H 5/145* (2013.01); *E05B 71/00* (2013.01)

(58) Field of Classification Search
CPC . B62H 5/00; B62H 5/14; B62H 5/141; B62H 5/142; B62H 5/145; B62H 5/147; E05B 71/00
See application file for complete search history.

(56) References Cited

U.S. PATENT DOCUMENTS

| | | | | |
|---|---|---|---|---|
| 603,780 A | * | 5/1898 | Wright | B62H 5/142 70/227 |
| 2,099,606 A | * | 11/1937 | Holsen | B62H 5/142 70/227 |
| 2,479,849 A | * | 8/1949 | Mangan | B62H 5/142 70/227 |
| 2,691,289 A | | 10/1954 | Wollaston | |
| 3,865,246 A | | 2/1975 | Lieb | |
| 3,988,910 A | * | 11/1976 | Widen | B62H 5/142 70/227 |
| 4,126,228 A | | 11/1978 | Bala | |
| 4,180,998 A | * | 1/1980 | Hellman | B62H 5/142 70/227 |
| 4,459,833 A | | 7/1984 | Waterkamp | |
| 4,571,965 A | | 2/1986 | LeRoux | |
| 5,069,049 A | * | 12/1991 | Shieh | B62H 5/142 70/227 |
| D365,745 S | | 1/1996 | Brendel | |
| 5,628,214 A | * | 5/1997 | Evers | B62H 5/14 70/227 |
| 5,832,753 A | * | 11/1998 | Nielsen | E05B 67/063 70/38 A |
| 6,751,992 B1 | | 6/2004 | Esquilin | |
| 7,631,525 B1 | | 12/2009 | Kennealy | |
| 10,131,390 B2 | * | 11/2018 | Kalupner | B62H 5/141 |

\* cited by examiner

*Primary Examiner* — Christopher J Boswell

(57) ABSTRACT

A bicycle lock system for inhibiting a bicycle from being stolen includes a bicycle that has a frame and a rear wheel. A locking unit is movably coupled to the frame and the locking unit is positioned adjacent to the rear wheel. The locking unit is positionable in a locked position having the locking unit extending through the rear wheel. In this way the rear wheel is inhibited from rotating thereby inhibiting the bicycle from being stolen. The locking unit is positionable in an unlocked position having the locking unit being displaced from the rear wheel thereby facilitating the rear wheel to freely rotate.

6 Claims, 5 Drawing Sheets

BICYCLE LOCK SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lock device and more particularly pertains to a new lock device for inhibiting a bicycle from being stolen.

(2) Description of Related Art Including Information Disclosed Under 37 CFR 1.97 and 1.98

The prior art relates to lock devices.

BRIEF SUMMARY OF THE INVENTION

An embodiment of the disclosure meets the needs presented above by generally comprising a bicycle that has a frame and a rear wheel. A locking unit is movably coupled to the frame and the locking unit is positioned adjacent to the rear wheel. The locking unit is positionable in a locked position having the locking unit extending through the rear wheel. In this way the rear wheel is inhibited from rotating thereby inhibiting the bicycle from being stolen. The locking unit is positionable in an unlocked position having the locking unit being displaced from the rear wheel thereby facilitating the rear wheel to freely rotate.

There has thus been outlined, rather broadly, the more important features of the disclosure in order that the detailed description thereof that follows may be better understood, and in order that the present contribution to the art may be better appreciated.

There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
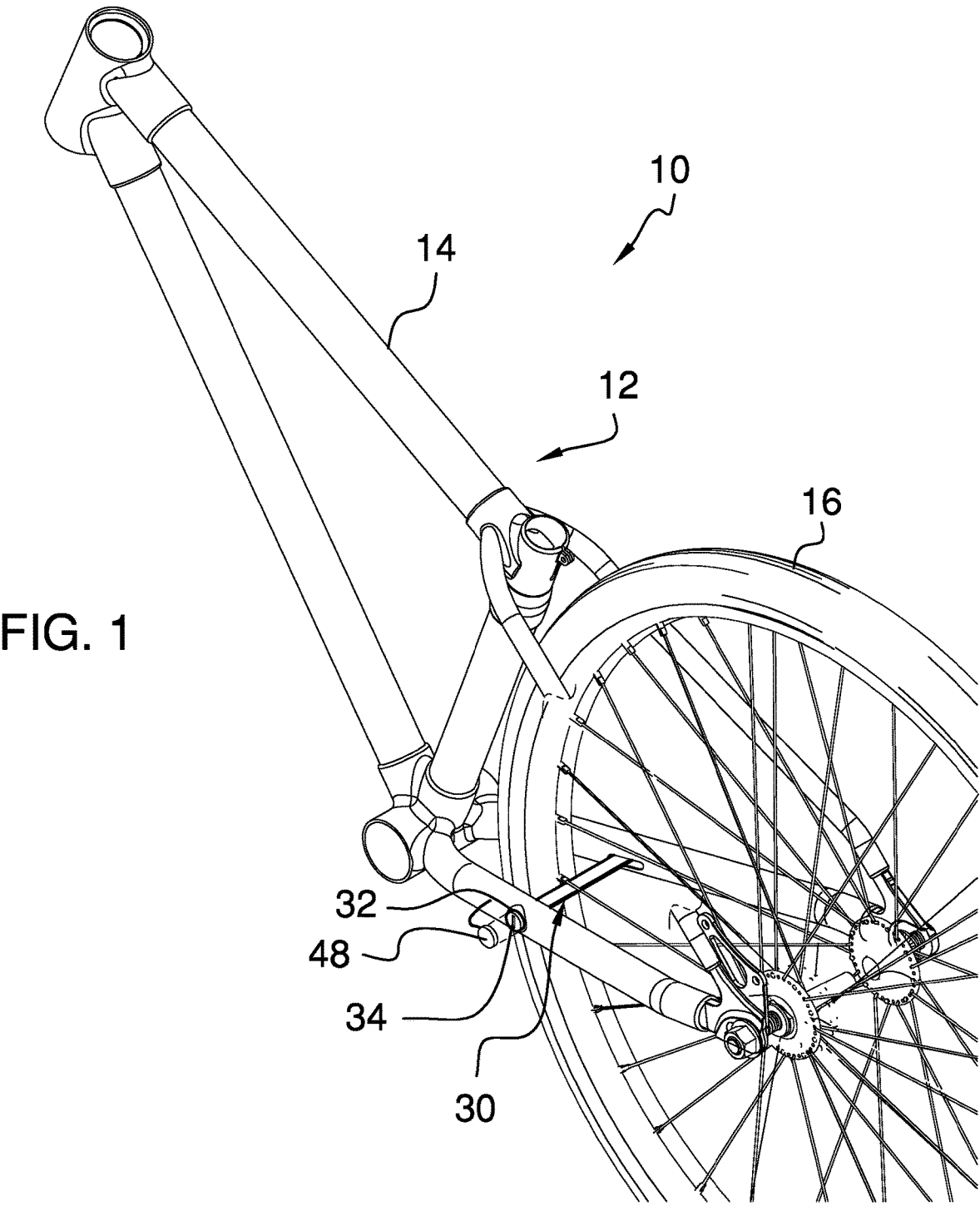
FIG. 1 is a perspective view of a bicycle lock system according to an embodiment of the disclosure.
Figure 2:
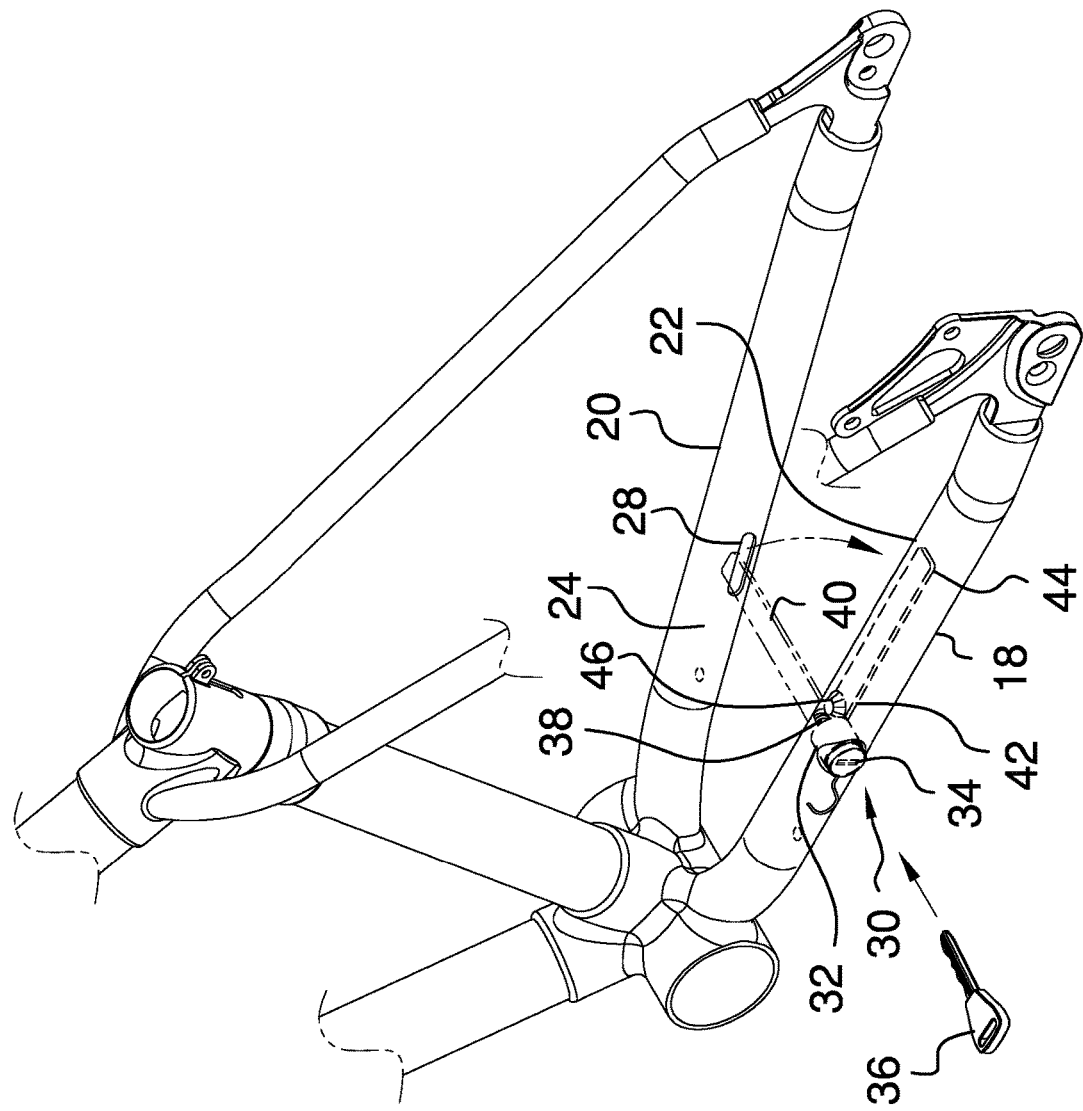
FIG. 2 is a phantom perspective view of an embodiment of the disclosure.
Figure 3:
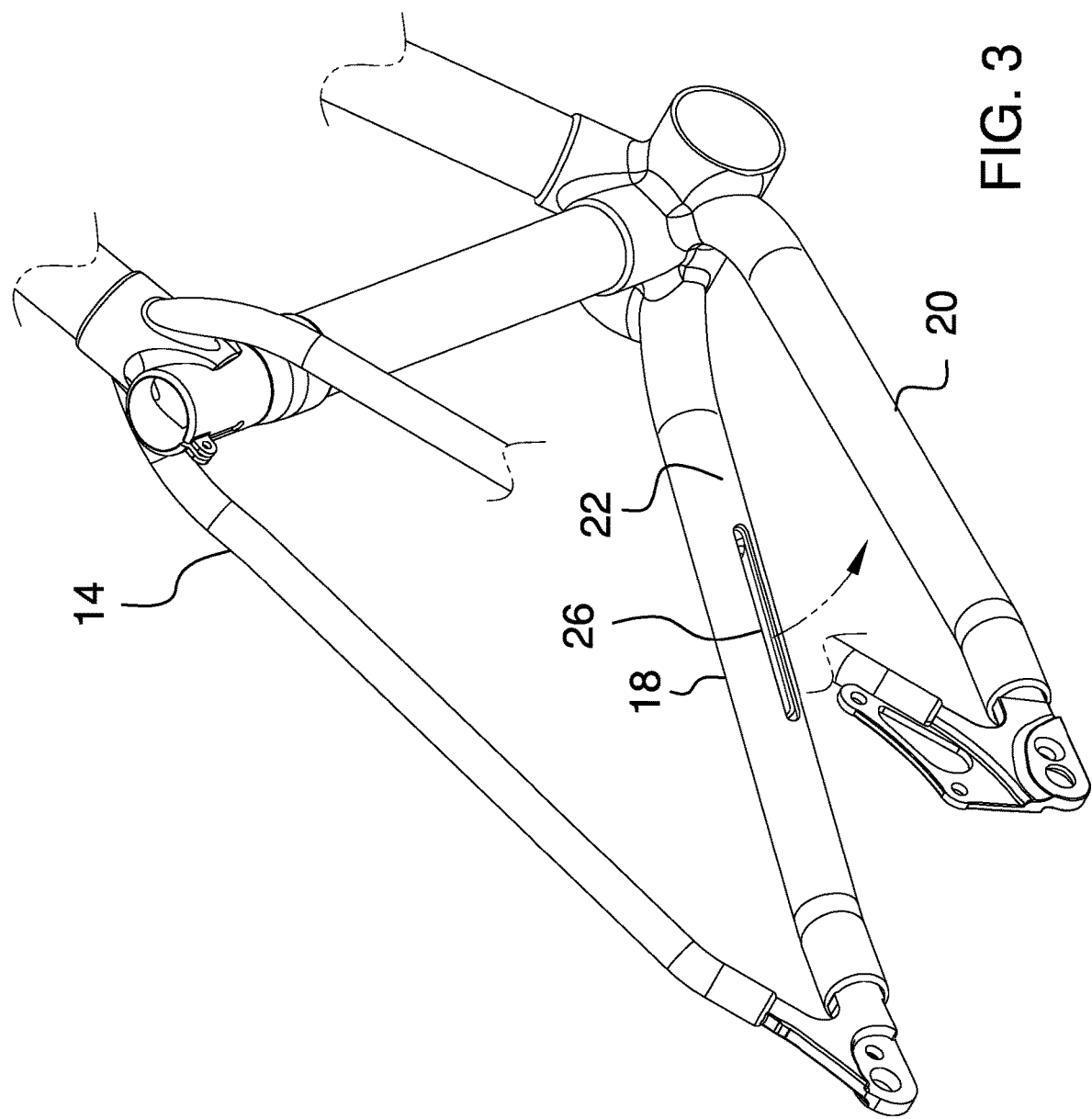
FIG. 3 is a right side perspective view of an embodiment of the disclosure.
Figure 4:
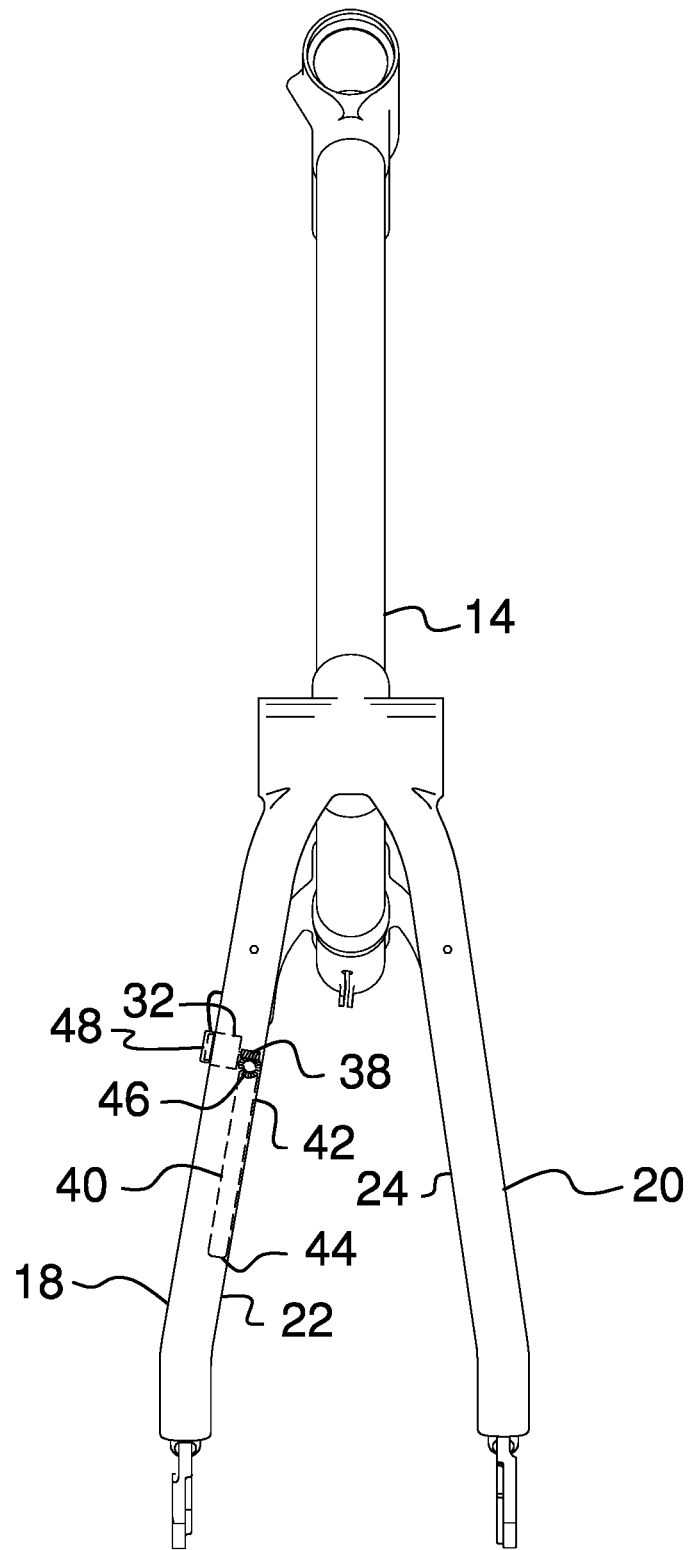
FIG. 4 is a bottom phantom view of an embodiment of the disclosure.
Figure 5:
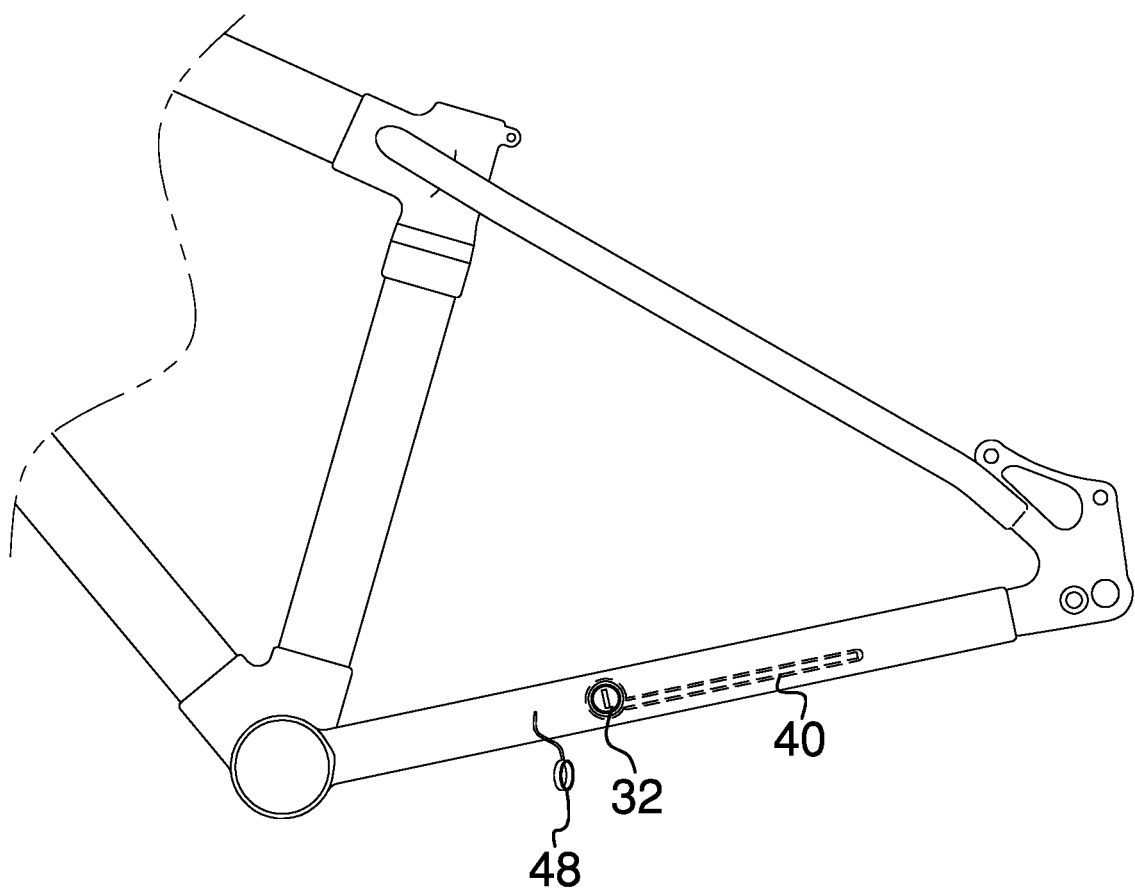
FIG. 5 is a left side phantom view of an embodiment of the disclosure.

With reference now to the drawings, and in particular to FIGS. 1 through 5 thereof, a new lock device embodying the principles and concepts of an embodiment of the disclosure and generally designated by the reference numeral 10 will be described.

As best illustrated in FIGS. 1 through 5, the bicycle lock system 10 generally comprises a bicycle 12 that has a frame 14 and a rear wheel 16. The frame 14 includes a first rear wheel fork 18 and a second rear wheel fork 20. The rear wheel 16 is rotatably mounted between each of the first rear wheel fork 18 and the second rear wheel fork 20. The first rear wheel fork 18 has a first side 22 and the second rear wheel fork 20 has a primary side 24. Each of the first side 22 and the primary side 24 is directed toward the rear wheel 16.

The first rear wheel fork 18 has a slot 26 extending through the first side 22. The slot 26 is horizontally oriented on the first side 22. The second rear wheel fork 20 has an opening 28 extending through the primary side 24. The opening 28 is aligned with the slot 26 in the first side 22 of the first rear wheel fork 18. The bicycle 12 may be a touring bicycle 12, a mountain bicycle 12 or any other type of bicycle 12.

A locking unit 30 is provided and the locking unit 30 is movably coupled to the frame 14. The locking unit 30 is positioned adjacent to the rear wheel 16. The locking unit 30 is positionable in a locked position having the locking unit 30 extending through the rear wheel 16. In this way the locking unit 30 inhibits the rear wheel 16 from rotating thereby inhibiting the bicycle 12 from being stolen. The locking unit 30 is positionable in an unlocked position having the locking unit 30 being displaced from the rear wheel 16. Thus, the rear wheel 16 can freely rotate.

The locking unit 30 comprises a lock tumbler 32 that extends through the first rear wheel fork 18. The lock tumbler 32 has a key slot 34 therein for insertably receiving a key 36. The lock tumbler 32 is rotatable between a locked position and an unlocked position. A worm gear 38 is rotatably coupled to the lock tumbler 32 and the worm gear 38 is positioned within the first rear wheel fork 18. The worm gear 38 is rotated in first direction when the lock tumbler 32 is rotated into the locked position. Additionally, the worm gear 38 is rotated in a second direction when the lock tumbler 32 is rotated into the unlocked position.

The locking unit 30 includes an arm 40 that has a first end 42 and a second end 44. The first end 42 is pivotally coupled to a pivot point that is located within the first rear wheel fork 18. The arm 40 extends along a horizontal axis and the arm 40 is aligned with the slot 26 in the first side 22 of the first rear wheel fork 18. The arm 40 is positionable in a retracted position having the arm 40 being contained within the first rear wheel fork 18. The arm 40 is positionable in a deployed position having the arm 40 extending outwardly through the slot 26 and into the opening 28 in the primary side 24 of the second rear wheel fork 20.

The locking unit 30 includes a drive gear 46 that is coupled to the arm 40. The drive gear 46 is aligned with the first end 42 of the arm 40 and the drive gear 46 engages the worm gear 38. The drive gear 46 has a rotational axis that is oriented perpendicular to a rotational axis of the worm gear 38. The arm 40 is urged into the deployed position when the worm gear 38 rotates in the first direction. Conversely, the arm 40 is urged into the retracted position when the worm gear 38 rotates in the second direction. A cap 48 is coupled to the first rear wheel fork 18 with a tether or the like. The cap 48 is positionable over the key slot 34 in the lock tumbler 32 for protecting the key slot 34 from contaminants.

In use, the key 36 is inserted into the key slot 34 for rotating the lock tumbler 32 between locked position and the unlocked position. The arm 40 extends through the rear wheel 16 when the arm 40 is urged into the deployed position. Thus, spokes on the rear wheel 16 will strike the arm 40 when the rear wheel 16 is rotated. In this way the arm 40 inhibits the rear wheel 16 from being rotated. The arm 40 is retracted into the first rear wheel fork 18 when the arm 40 is urged into the retracted position. In this way the rear wheel 16 can freely rotate.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bicycle lock system comprising:
   a bicycle having a frame and a rear wheel; and
   a locking unit being movably coupled to said frame, said locking unit being positioned adjacent to said rear wheel, said locking unit being positionable in a locked position having said locking unit extending through said rear wheel thereby inhibiting said rear wheel from rotating wherein said locking unit is configured to inhibit said bicycle from being stolen, said locking unit being positionable in an unlocked position having said locking unit being displaced from said rear wheel thereby facilitating said rear wheel to freely rotate;
   said frame including a first rear wheel fork and a second rear wheel fork, said rear wheel being rotatably mounted between each of said first rear wheel fork and said second rear wheel fork, said first rear wheel fork having a first side, said second rear wheel fork having a primary side, each of said first side and said primary side being directed toward said rear wheel;
   said first rear wheel fork having a slot extending through said first side, said slot being horizontally oriented on said first side;
   said second rear wheel fork having an opening extending through said primary side, said opening being aligned with said slot in said first side of said first rear wheel fork;
   said locking unit comprising a lock tumbler extending through said first rear wheel fork, said lock tumbler having a key slot therein for insertably receiving a key, said lock tumbler being rotatable between a locked position and an unlocked position; and
   a worm gear being rotatably coupled to said lock tumbler, said worm gear being positioned within said first rear wheel fork, said worm gear being rotated in first direction when said lock tumbler is rotated into said locked position, said worm gear rotating in a second direction when said lock tumbler is rotated into said unlocked position.

2. The system according to claim 1, wherein:
   said frame includes a first rear wheel fork and a second rear wheel fork, said rear wheel being rotatably mounted between each of said first rear wheel fork and said second rear wheel fork, said first rear wheel fork having a first side, said second rear wheel fork having a primary side, each of said first side and said primary side being directed toward said rear wheel;
   said first rear wheel fork has a slot extending through said first side, said slot being horizontally oriented on said first side; and
   said second rear wheel fork has an opening extending through said primary side, said opening being aligned with said slot in said first side of said first rear wheel fork.

3. The system according to claim 1, further comprising an arm having a first end and a second end, said first end being pivotally coupled to a pivot point being located within said first rear wheel fork, said arm extending along a horizontal axis, said arm being aligned with said slot in said first side of said first rear wheel fork.

4. The system according to claim 3, wherein said arm is positionable in a retracted position having said arm being contained within said first rear wheel fork, said arm being positionable in a deployed position having said arm extending outwardly through said slot and into said opening in said primary side of said second rear wheel fork.

5. The system according to claim 4, further comprising a drive gear being coupled to said arm, said drive gear being aligned with said first end of said arm, said drive gear engaging said worm gear, said drive gear having a rotational axis being oriented perpendicular to a rotational axis of said worm gear, said arm being urged into said deployed position when said worm gear rotates in said first direction, said arm being urged into said retracted position when said worm gear rotates in said second direction.

6. A bicycle lock system comprising:
- a bicycle having a frame and a rear wheel, said frame including a first rear wheel fork and a second rear wheel fork, said rear wheel being rotatably mounted between each of said first rear wheel fork and said second rear wheel fork, said first rear wheel fork having a first side, said second rear wheel fork having a primary side, each of said first side and said primary side being directed toward said rear wheel, said first rear Wheel fork having a slot extending through said first side, said slot being horizontally oriented on said first side, said second rear wheel fork having an opening extending through said primary side, said opening being aligned with said slot in said first side of said first rear wheel fork; and
- a locking unit being movably coupled to said frame, said locking unit being positioned adjacent to said rear wheel, said locking unit being positionable in a locked position having said locking unit extending through said rear wheel thereby inhibiting said rear wheel from rotating wherein said locking unit is configured to inhibit said bicycle from being stolen, said locking unit being positionable in an unlocked position having said locking unit being displaced from said rear wheel thereby facilitating said rear wheel to freely rotate, said locking unit comprising:
  - a lock tumbler extending through said first rear wheel fork, said lock tumbler having a key slot therein for insertably receiving a key, said lock tumbler being rotatable between a locked position and an unlocked position;
  - a worm gear being rotatably coupled to said lock tumbler, said worm gear being positioned within said first rear wheel fork, said worm gear being rotated in first direction when said lock tumbler is rotated into said locked position, said worm gear rotating in a second direction when said lock tumbler is rotated into said unlocked position;
  - an arm having a first end and a second end, said first end being pivotally coupled to a pivot point being located within said first rear wheel fork, said arm extending along a horizontal axis, said arm being aligned with said slot in said first side of said first rear wheel fork, said arm being positionable in a retracted position having said arm being contained within said first rear wheel fork, said arm being positionable in a deployed position having said arm extending outwardly through said slot and into said opening in said primary side of said second rear wheel fork; and
  - a drive gear being coupled to said arm, said drive gear being aligned with said first end of said arm, said drive gear engaging said worm gear, said drive gear having a rotational axis being oriented perpendicular to a rotational axis of said worm gear, said arm being urged into said deployed position when said worm gear rotates in said first direction, said arm being urged into said retracted position when said worm gear rotates in said second direction; and
  - a cap being coupled to said first rear wheel fork, said cap being positionable over said key slot in said lock tumbler for protecting said key slot from contaminants.

\* \* \* \* \*